(12) United States Patent
Pulugurta

(10) Patent No.: US 8,311,536 B1
(45) Date of Patent: Nov. 13, 2012

(54) PEER-TO-PEER REDIRECTION OF A ROAMING WIRELESS COMMUNICATION DEVICE TO A NEARBY HOME BASE STATION

(75) Inventor: Srikanth Pulugurta, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 437 days.

(21) Appl. No.: 12/539,951

(22) Filed: Aug. 12, 2009

(51) Int. Cl.
*H04W 4/00* (2009.01)
*H04W 36/00* (2009.01)

(52) U.S. Cl. .................. 455/433; 455/440; 455/432

(58) Field of Classification Search .......... 455/440, 455/433, 432.1, 456.1, 456.3
See application file for complete search history.

(56) References Cited

U.S. PATENT DOCUMENTS

| | | | |
|---|---|---|---|
| 5,787,347 A * | 7/1998 | Yu et al. .............. | 455/440 |
| 5,940,743 A | 8/1999 | Sunay et al. | |
| 6,091,954 A | 7/2000 | Haartsen et al. | |
| 6,438,369 B1 | 8/2002 | Huang et al. | |
| 6,453,162 B1 * | 9/2002 | Gentry .................. | 455/433 |
| 6,714,789 B1 | 3/2004 | Oh et al. | |
| 7,072,651 B2 * | 7/2006 | Jiang et al. .............. | 455/432.1 |
| 7,092,722 B1 | 8/2006 | Oh et al. | |
| 7,110,773 B1 * | 9/2006 | Wallace et al. ........... | 455/456.1 |
| 7,127,245 B2 | 10/2006 | Almgren | |
| 7,330,728 B1 * | 2/2008 | Moll et al. .............. | 455/456.3 |
| 2002/0019228 A1 | 2/2002 | McKenna et al. | |
| 2006/0068778 A1 | 3/2006 | Della-Torre | |
| 2007/0099644 A1 | 5/2007 | Batra et al. | |
| 2009/0023447 A1 | 1/2009 | Hagerman et al. | |
| 2010/0075669 A1 | 3/2010 | Sparks et al. | |

OTHER PUBLICATIONS

Office Action from U.S. Appl. No. 12/579,559, dated May 23, 2012.

* cited by examiner

*Primary Examiner* — Kent Chang
*Assistant Examiner* — Kuo Woo

(57) ABSTRACT

A method, apparatus, and system in which a wireless communication device that is registered for service with a roaming carrier network engages in peer-to-peer communication, via the roaming carrier network, with a home carrier server to notify the home carrier server of the device's roaming status and location, and the device then receives in response from the home carrier server a directive to register with and be served by a nearby home carrier base station instead.

20 Claims, 5 Drawing Sheets

PEER-TO-PEER REDIRECTION OF A ROAMING WIRELESS COMMUNICATION DEVICE TO A NEARBY HOME BASE STATION

BACKGROUND

In typical cellular wireless communications, each end-user device (e.g., cell phone, personal digital assistant, wirelessly equipped personal computer, etc.) subscribes to service from a given cellular wireless carrier known as the device's home carrier. In practice, the home carrier will operate one or more radio access networks including base stations that radiate to define wireless coverage areas in which the end-user devices can operate. When a device enters into coverage of its home carrier's network, the device may then register with the home carrier network and may then engage in wireless communication service via the home carrier's network, and the home carrier may accordingly charge or debit a service account of the device.

Although a typical cellular carrier may strive to offer wireless coverage throughout a region, such as nationally in the United States for instance, the carrier may not actually operate radio access networks in all locations throughout the region. To fill in gaps where the carrier does not operate its own radio access networks and thus where the carrier does not itself provide coverage, the carrier will typically enter into roaming agreements with other carriers. Under a roaming agreement, another carrier may agree to provide service to the home carrier's subscriber devices when the devices operate in the roaming carrier's network. Thus, when a device enters into coverage of a roaming carrier's network, the device may register for service with the roaming carrier's network and may then engage in wireless communication service via the roaming carrier's network. In accordance with the roaming agreement, the roaming carrier may then report that usage to the home carrier and may charge the home carrier for the usage. And the home carrier may then pass that charge along to the service account of the device.

OVERVIEW

As a general matter, a home carrier may prefer to have its subscribers operate in coverage of the home carrier's network, rather than in coverage of a roaming carrier's network. One reason for this is that the home carrier will typically profit more when the home carrier charges the subscriber for use of the home carrier's network and services than when the home carrier merely passes a roaming carrier's charges along to the subscriber. Another reason for this is that, when a subscriber is roaming, the subscriber may not benefit from full access to the home carrier's services and support, which may lead to poor user experience.

The choice of operating in home network coverage or roaming network coverage becomes an issue in a region where both home network coverage and roaming network coverage are provided. Throughout such a region, there may be some areas where the home carrier provides coverage and other areas where the home carrier does not provide coverage but a roaming carrier provides coverage, and there may be areas where both the home carrier and a roaming carrier provide coverage.

To promote subscriber operation in home network coverage, the home carrier will typically provision each of its subscriber devices with a "preferred roaming list" (PRL) that defines a priority order for each device to scan for available network coverage. The PRL will generally list networks or systems operated by the home carrier with higher priority than networks or systems operated by roaming carriers, and the PRL may further define a priority order among roaming carriers. As the device scans for available coverage according to the PRL, the device will thus typically first scan for coverage of a home carrier network and, if the device does not succeed, will then scan for coverage of a roaming carrier network. In either case, once the device finds a suitable network, the device may then register for service with that network and then proceed to engage in communication service via that network.

In an area where both home network coverage and roaming network coverage exist, the PRL should cause a subscriber device to register with the home carrier network rather than with a roaming carrier network. However, there are situations where a subscriber device in such an area may acquire or maintain connectivity with a roaming carrier network instead of registering with a home carrier network. For example, although both the home carrier network and roaming carrier network may be emitting pilot signals in the area, interference issues may prevent the device from receiving the home carrier pilot signal at a sufficient signal strength. Thus, the device may consider the roaming carrier pilot signal to represent the most preferred network and may responsively register with and be served by the roaming carrier network.

As another example, if the device is engaged in a call (e.g., voice call and/or data session) while roaming and moves during the call into an area where both home network coverage and roaming network coverage exist, the device may remain registered with and served by the roaming carrier network for the duration of the call. Furthermore, once the call ends, it may take some time before the device scans for and detects the home network coverage and then transitions to register with the home network. During that time, if the device begins a new call, the call may be served by the roaming carrier network as the device is registered with that network, notwithstanding the fact that home network coverage exists.

One way to help avoid this situation is to have the home carrier detect when the subscriber device seeks to register for service with a roaming carrier, and have the home carrier respond to that registration attempt by directing the device to scan for another system instead. For instance, when the device sends a registration request message to the roaming carrier network, a mobile switching center (MSC) or other node in the roaming carrier network may pass a corresponding registration request along to a home location register (HLR) operated by the home carrier, to register the device for service in the roaming carrier network. Upon receipt of such a registration request, the HLR may then determine that a more preferable system (e.g., a home carrier network) exists in the device's geographic location, and the HLR may send to the roaming carrier's MSC a response message that identifies the preferred system and that directs the MSC to redirect the device to that system. Upon receipt of that response message from the HLR, the roaming carrier MSC may thus transmit to the device a redirection message that causes the device to scan for coverage of the more preferred system. And upon finding that more preferred system, the device may then register for service with the preferred system.

A problem with this solution, however, is that it interferes with the conventional registration process, in that it requires special processing in the HLR to reject a registration request rather than allowing the registration to proceed as normal. Further, perhaps even more problematic is the thought that a roaming carrier would decline to serve a potential customer and would be willing to redirect the potential customer to a competitor's network. Therefore, a better solution is desired.

Disclosed herein is a method, apparatus, and system in which a wireless communication device that is registered for service with a roaming carrier network engages in peer-to-peer communication via the roaming carrier network with a home carrier server to notify the home carrier server of the device's roaming status and location and to receive in response from the home carrier server a directive to register with and be served by a nearby home carrier base station instead.

Advantageously, this method can avoid interfering with the normal process of registering with the roaming carrier. Rather, the method assumes that the device completes such registration and is currently being served by the roaming carrier network. While in that roaming mode, the device reports the device's location in a peer-to-peer message, such as an HTTP, SMS, or SIP message to a server operated by the home carrier. And the home carrier server responds in kind with a message to the device that directs the device to communicate with a nearby home base station instead. This peer-to-peer messaging between the device and the home carrier server flows passively through the roaming carrier network that is serving the device, just like any other bearer communication transmitted to or from the wireless device via that network. The messaging can take various forms, examples of which include Hypertext Transport Protocol (HTTP) messaging, Short Messaging Service (SMS) messaging, and Session Initiation Protocol (SIP) messaging.

Ideally, the directive from the home carrier server to the device will specify one or more operational parameters of the nearby home carrier base station (e.g., operating frequency (carrier frequency), system ID/network ID (SID/NID) information, coverage area coding or identification, etc.), so that the device can readily tune to and begin communicating with the nearby home carrier base station. The device will then preferably output a registration message in accordance with those operational parameters, so that the nearby home carrier base station will receive the registration message, thus triggering registration of the device with the home carrier network and corresponding deregistration of the device from the roaming carrier network.

Furthermore, the directive from the home carrier server to the device may advantageously also specify an initial transmit power level that the device should use for transmissions to the nearby home carrier base station, with the initial transmit power being selected based on a distance between the reported location of the device and a known location of the nearby home carrier base station. By specifying and causing the device to use such an initial transmit power level, the directive can help minimize the power control signaling that would normally occur between the device and the nearby home carrier base station to cause the device to transmit at a suitable power level to the base station.

To facilitate implementation of this method in practice, the home carrier may program the subscriber device with logic that causes the device to report its location to the home carrier server while the device is fully registered with the roaming carrier, and to receive and comply with a home carrier server directive that responsively directs the device to transition over to register with and be served by the nearby home carrier base station instead.

These as well as other aspects, advantages and alternatives will become apparent to those of ordinary skill in the art by reading the following detailed description, with reference where appropriate to the accompanying drawings. Further, it should be understood that the description provided in this document, including the foregoing overview, is intended as an example only and is not intended to limit the scope of the invention as claimed.

DETAILED DESCRIPTION

Figure 1:
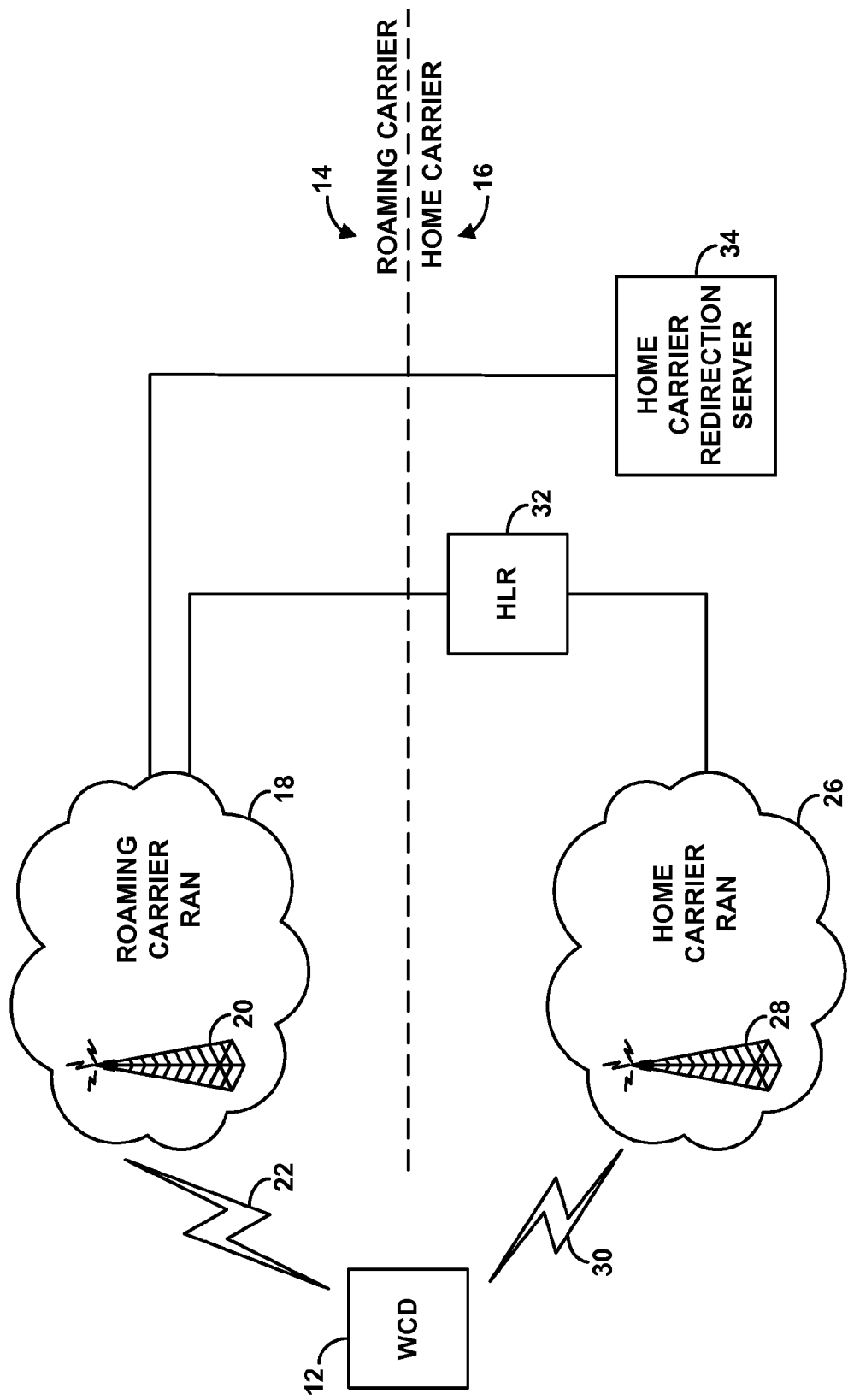
FIG. 1 is simplified block diagram of a wireless communication system in which the present method can be implemented.

Referring to the drawings, as noted above, FIG. 1 is a simplified block diagram of a wireless communication system in which an exemplary embodiment of the present method can be implemented. As shown, the system includes a cellular wireless communication device (WCD) 12 that operates under an established service subscription with a home carrier and is thus able to engage in cellular wireless communication service via a serving radio access network and have that service be charged against the WCD's service account with the home carrier.

The figure is divided by a horizontal dashed line into a roaming carrier system 14 at the top and a home carrier system 16 at the bottom. The roaming carrier system 14 includes a roaming carrier radio access network (RAN) 18, which includes a roaming carrier base transceiver station (base station) 20 that radiates to define an air interface 22 through which WCD 12 can communicate with RAN 18. Likewise, the home carrier system 16 includes a home carrier RAN 26, which includes a home carrier base station 28 that radiates to define an air interface 30 through which the WCD can communicate with RAN 26. Although each carrier would likely have more than one base station and perhaps more than one RAN, only one of each is shown for simplicity.

The home carrier system 24 is further shown including a home location register (HLR) 32 and a home carrier redirection server 34.

The HLR comprises a computer server that stores or has access to service profile records for subscribers of the home carrier such as WCD 12. Among other information, the profile record for WCD 12 preferably specifies which system (e.g., which RAN) is currently serving the WCD. In particular, various switches (e.g., mobile switching centers) that are part of carrier RANs may have identifiers such as "point codes," and the profile record for a given WCD may indicate the identifier of the switch currently serving the WCD. That way, when a call (e.g., voice call, SMS message, etc.) is placed to the WCD, a query to the HLR can function to determine the current serving switch, and the call can be routed to that switch for connection to the WCD.

In practice, when a WCD scans for coverage in accordance with its PRL and detects coverage of a given RAN (e.g., a strong enough pilot signal emitted by a base station of the RAN), the WCD may register for service with the RAN (i.e., with the carrier that operates the RAN). In particular, the WCD may transmit over an air interface to the base station an access probe that functions as a registration request. Upon receipt of the registration request, the RAN (e.g., anm MSC of the RAN) may then send a corresponding registration request message (e.g., an IS-41 REGNOT message) to the HLR that holds the WCD's service profile. The HLR may then authenticate/authorize the WCD for the requested service and may responsively update the WCD's registration record to identify the current serving system and send a positive registration response message (e.g, an IS-41 regnot_rr) to the requesting RAN. In turn, the RAN may then send a registration response message or acknowledgement over the air to the WCD and may establish a local profile record (e.g., a visitor location register (VLR) record) for the WCD. Upon completing this registration process, the WCD may then engage in communication service via the serving RAN, such as to place/receive telephone calls, send/receive SMS messages, and engage in wireless packet data communication, depending on the capabilities of the WCD.

This same type of registration process may occur regardless of whether the WCD is registering with the roaming carrier RAN 18 or the home carrier RAN 26. When the WCD detects coverage of the roaming carrier RAN 18 and decides to register with that RAN, the WCD sends a registration request to the roaming carrier base station 20, which triggers a registration request from the roaming carrier RAN to the HLR and thus causes a corresponding update of the WCD's service profile and a completion of the registration process so that the WCD can then engage in communication service via the roaming carrier RAN. Likewise, when the WCD detects coverage of the home carrier RAN 26 and decides to register with that RAN, the WCD sends a registration request to the home carrier base station 28, which triggers a registration request from the home carrier RAN to the HLR and thus causes a corresponding update of the WCD's service profile and a completion of the registration process so that the WCD can then engage in communication service via the home carrier RAN.

The home carrier redirection server (HCRS) 34 operates separately from the registration process, as operation of the HCRS assumes that the WCD is currently registered with and is being served by a roaming carrier network, such as roaming carrier RAN 18. The HCRS 34 is preferably a computer server including a processor programmed with machine language instructions executable to carry out various functions described herein. In particular, the HCRS functions to engage in peer-to-peer communication with the WCD via the serving roaming carrier RAN 18, to receive from the WCD a report of the WCD's geographic location and to direct the WCD to transition to be served instead by a nearby home carrier base station, such as home carrier base station 28 for instance. Advantageously, the communication between WCD 12 and HCRS 34 is preferably application layer communication, such as HTTP or SMS communication for instance and, as noted above, extends passively through the serving roaming carrier RAN 18 just like any other bearer communication in which the WCD engages via the serving roaming carrier RAN 18. Thus, implementation of the present method does not require any modification to the conventional registration process or any special or out-of-the-ordinary functions carried out by the roaming carrier RAN (although such functions are not precluded either).

Figure 2:
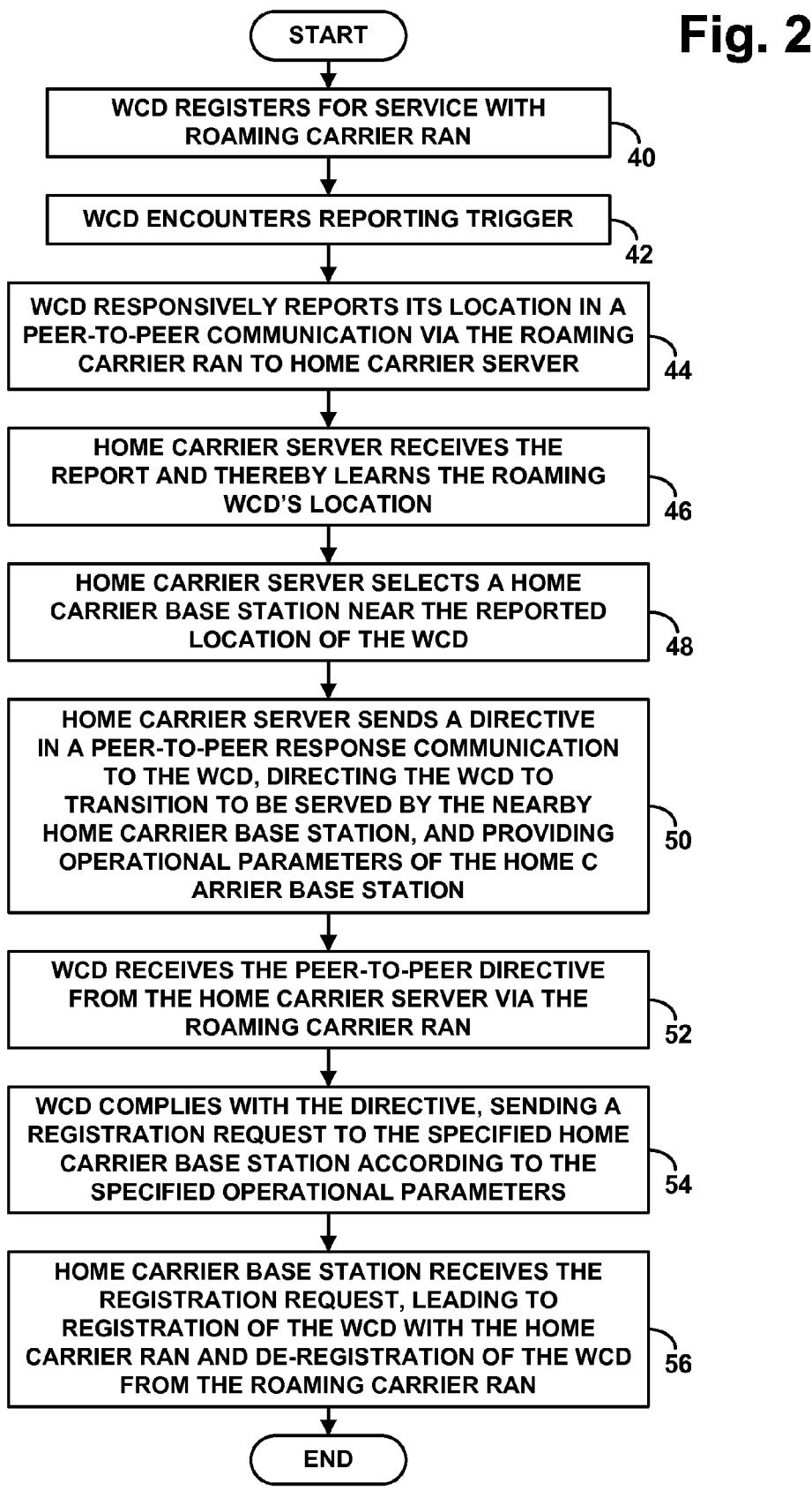
FIG. 2 is a flow chart depicting functions that can be implemented in accordance with the method.

FIG. 2 is next a flow chart depicting a set of functions that can be carried out in accordance with the present method, in the context of FIG. 1. As shown in FIG. 2, at block 40, the WCD 12 registers for service with roaming carrier RAN 18 in the manner discussed above for instance. This may occur after the WCD has scanned the airwaves for pilot signals and found the most preferred available coverage to be provided by roaming carrier base station 20 (e.g., by a particular sector defined by antennas of that base station). This may be the case even if nearby home carrier base station 28 also provides coverage at the WCD's location and even though the nearby home carrier base station coverage may be preferable to that of the roaming carrier base station 20, as the WCD for some reason may not have detected the home carrier base station coverage or may have detected but decided to not register with the home base station (e.g., due to a flawed PRL or other issue).

At block 42, when the WCD is thus registered for service with the roaming carrier RAN and is being served by the roaming carrier RAN (e.g., the roaming carrier RAN has a local service profile in a VLR for the WCD, such that the WCD can place/receive calls (e.g., voice calls or packet-data sessions) via the roaming carrier RAN), the WCD encounters a reporting trigger. A reporting trigger in this context is an event that triggers the WCD to report its location to the HCRS 34 to enable the home carrier to select a nearby home base station and to direct the WCD to transition to be served by the selected nearby home base station. Examples of reporting triggers include (i) completion of registration with the roaming carrier, (ii) establishing an active communication session served by the roaming carrier RAN, (iii) ending of a call conducted while being served by the roaming carrier RAN, and (iv) elapse of a predefined period of time after those or other events. Encountering such a trigger involves detecting the occurrence of the trigger. For example, the WCD may detect completion of registration with the roaming carrier by receiving a positive acknowledgement of its request to register with the roaming carrier. As another example, the WCD may detect completion of a call conducted while being served by the roaming carrier RAN when the WCD itself ends the call or when the WCD receives a signaling message from the roaming carrier RAN indicating that the call is ended. Other examples are possible as well.

At block 44, in response to the reporting trigger, the WCD reports its location in a peer-to-peer communication to the HCRS 34. As noted above, this communication is preferably an application layer communication between the WCD and the HCRS. As such, the WCD is preferably pre-provisioned with an address of the HCRS so that the WCD can send the report to that address. For example, the communication may be an Internet-protocol based communication such as an HTTP or SIP communication, and so the WCD may be pre-provisioned with data specifying an Internet Protocol (IP) address, Uniform Resource Locator (URL), or SIP address of the HCRS so that the WCD can send the peer-to-peer communication to that address. As another example, the communication may be an SMS message, and so the WCD may be pre-provisioned with data specifying an SMS address (e.g., a short-code or feature-code) to which the WCD can send the peer-to-peer communication.

To facilitate reporting its location to the HCRS, the WCD must of course determine (e.g., compute, learn, be provided with, or otherwise ascertain) its location. Preferably, the WCD includes a Global Positioning System (GPS) receiver to facilitate determining its location based on received GPS signals in a manner well known in the art or the WCD is otherwise equipped and arranged to determine its location in a manner now known or later developed, by itself and/or with network assistance. The granularity of the location determination is not critical. But a more granular location determination such as provided by GPS functionality will of course facilitate a more accurate selection of a nearby home base station and is therefore preferred.

Once the WCD has encountered the reporting trigger and has determined its location, the WCD thus composes a reporting message and sends the message in a peer-to-peer communication, via the serving roaming carrier RAN, to the HCRS. For instance, in an HTTP message, SIP message, or SMS message, the WCD may specify the location in a body of the message, in a header parameter, or in some other manner. Further, the WCD may include in the message a specification of the roaming state of the WCD, to which the HCRS may respond by carrying out the HCRS functions of selecting a nearby home carrier base station based on the reported location and directing the WCD to transition over to be served by that nearby home carrier base station. The WCD may then transmit the reporting message to the HCRS via the serving roaming carrier RAN in just the same way that the WCD would engage in any other bearer communication via that RAN, preferably with the substance/content of the communication being of no interest to the serving RAN but the serving RAN merely forwarding the communication to its destination.

At block 46, the HCRS receives the peer-to-peer communication from the WCD and reads the reported location. And at block 48, the HCRS then selects a nearby home carrier base station based on the reported location. Although FIG. 1 shows only one nearby home carrier base station, there may be multiple such base stations; further there may be multiple directional sectors of each such base station. The theory here is that the HCRS will select a home carrier base station (e.g., a particular sector) that is closest to the reported location of the WCD, preferably also taking into consideration the directions and scope of radiation of various base stations (e.g., sectors) so as to select one that adequately covers the reported location of the WCD. Further, the HCRS may base the selection on other factors as well, such as levels of congestion in various base station coverage areas for instance (e.g., for load balancing purposes).

At block 50, the HCRS then sends a peer-to-peer response communication to the WCD, as a directive that directs the WCD to transition over to be served by the selected nearby home carrier base station. Optimally as noted above, the HCRS includes in this directive one or more operational parameters for the selected nearby home carrier base station, such a an operating frequency and sector coding or identification information. For instance, if each base station sector in an area has a respective coding parameter used for communication with the base station in that sector, the HCRS may include that coding parameter in the directive to the WCD. An example of such a coding parameter is a pseudo-random noise offset (PN offset) commonly used in code division multiple access (CDMA) communications, but other examples are possible as well.

Further, as also noted above, the HCRS may advantageously include in the directive to the WCD a specification of an initial power level that the WCD should use for transmitting to the selected nearby home base station. To facilitate this, the HCRS may include or have access to a set of data that specifies distances between WCDs and base stations (perhaps specifically distances from the selected nearby home carrier base station) and correlates each such distance with a preferred initial WCD transmission power. Such data can be established empirically over time by observing the transmission power that WCDs at that distance from the base station tend to end up transmitting after engaging in back and forth power control communication with the base station, and the data may be stored at the HCRS. The HCRS may thus determine the distance between the reported location of the WCD and the location of the selected nearby home carrier base station (e.g., sector point of origin) and may then refer to the data to determine what the preferred initial WCD transmit power level is for that distance. And the HCRS may include a specification of that initial WCD transmit power level in the peer-to-peer response communication that the HCRS sends to the WCD.

The HCRS may send the peer-to-peer response communication to the WCD in much the same way that the WCD sent the peer-to-peer reporting communication to the HCRS, again via the serving roaming carrier RAN. The response communication to the WCD may be the same type of communication sent by the WCD or may differ in form. For instance, if the WCD reported its location in an SMS message to the HCRS, the HCRS may send the directive to the WCD as a return SMS message or may send the response communication as a WAP Push or MMS message for instance, or in some other form. As another example, if the WCD reported its location in an HTTP message to the HCRS, the HCRS may send the directive to the WCD in a response HTTP message or in an SMS message, or in some other form. Other examples are possible as well.

At block 52, the WCD receives the peer-to-peer response communication from the HCRS via the serving roaming carrier RAN, in much the same way that the WCD receives any bearer communication transmitted from a peer via that RAN. And at block 54, the WCD then complies with the directive provided by the peer-to-peer response communication. In particular, the WCD preferably transmits a registration message over the air in accordance with operational parameters specified by the directive, for receipt of the registration message by the selected nearby home carrier base station. For instance, if the directive specified an operating frequency and PN offset of the selected nearby home carrier base station and specified an initial WCD transmit power, the WCD preferably transmits the registration message on that operating frequency, modulated with that PN offset, and does so at the specified initial transmit power level.

At block 56, the selected nearby home carrier base station 28 then preferably receives the registration message from the WCD, and the home carrier RAN 26 responsively signals with the HLR 32 to effect a registration of the WCD for service with the home carrier RAN 26 (e.g., the selected home carrier base station 28) and corresponding de-registration of the WCD from the roaming carrier RAN 18. Having thus transitioned to be served by the nearby home carrier base station 28, the WCD may then proceed to engage in communication service via the nearby home carrier base station.

Figure 3:
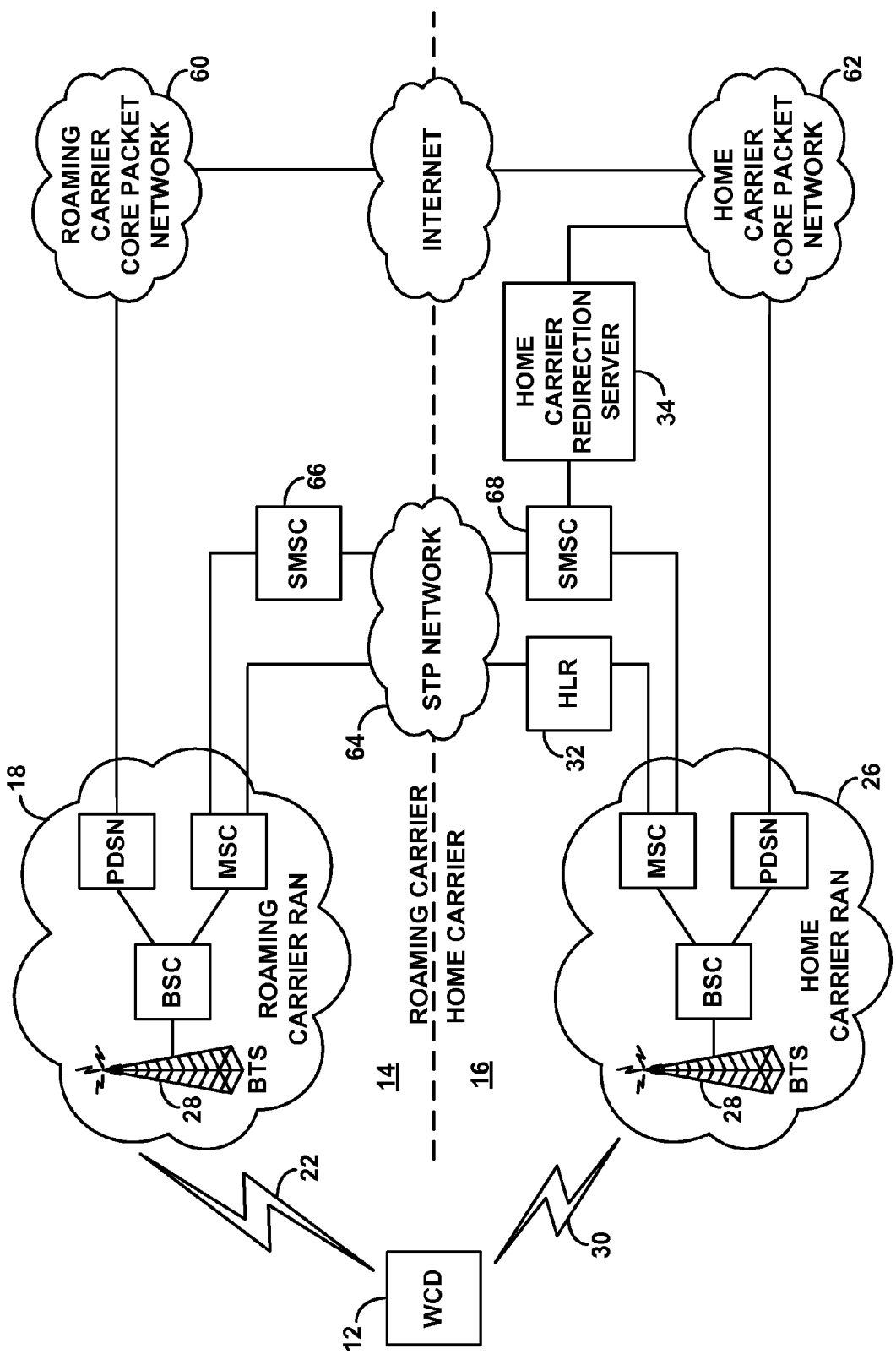
FIG. 3 is a more detailed block diagram depicting example components of the wireless communication system.

FIG. 3 is next a more specific block diagram depicting the structure of a wireless communication system in which the exemplary method can be implemented. FIG. 3 includes a dashed dividing line with a roaming carrier system 14 above the line and a home carrier system 16 below the line and depicts various other entities shown in FIG. 1. In FIG. 3, the roaming carrier RAN 18 and home carrier RAN 26 are each shown including a base transceiver station (BTS) coupled with a base station controller (BSC), which is in turn coupled with a packet data serving node (PDSN) that provides connectivity with a packet-switched network and a mobile switching center (MSC) that provides connectivity with the public switched telephone network (not shown). Each PDSN is shown coupled with a respective core packet-data network of the carrier at issue. In particular, a PDSN of the roaming carrier RAN is shown coupled with a roaming carrier core packet-data network 60, and a PDSN of the home carrier RAN is shown coupled with a home carrier core packet-data network 60. The two core-packet data networks 60, 62 are then shown coupled with the Internet (with appropriate firewall protection, not shown), such that packet-data communications can pass from one to the other.

It should be understood that these RAN configurations are merely examples, and that numerous other RAN configurations are possible as well. For instance, some of the RAN components shown can be duplicated, omitted, integrated together, distributed into multiple components, or otherwise modified. A given RAN can also be far more complex than that shown or can be much simpler, perhaps as simple as an access point router for instance. Further, although the roaming carrier RAN 18 and home carrier RAN are shown with the same configuration as each other, they can differ in configuration and form.

Generally, a BTS radiates to define an air interface in which served WCDs can communicate with the BTS, and thus with the RAN, according to an agreed air interface protocol. Examples of such protocols include CDMA, WiMAX, iDEN, TDMA, GSM, LTE, and others now known or later developed. Further variations on these and other protocols are possible as well. WCD 12 will be arranged to communicate with each BTS according to the agreed air interface protocol. Further, it is possible that each RAN may use a different air interface protocol and that the WCD may be equipped to engage in air interface communication according to both (or more generally multiple) air interface protocols. Thus, the redirection process presently contemplated can involve directing the WCD to use a particular air interface protocol different than the one currently being used by the WCD so that the WCD can communicate with the selected nearby home base station.

FIG. 3 further depicts a signal transfer point (STP) network through which certain control and bearer signaling can pass between portions of the system, such as between the roaming carrier RAN and the home carrier RAN. For instance, when the roaming carrier RAN 18 sends an IS-41 REGNOT message to HLR 32 to register WCD 12 for service with the roaming carrier RAN, that REGNOT message may pass into the STP network 64 and be routed to the HLR 32. Likewise, an IS-41 regnot_rr response message may pass from HLR 32 via the STP network 64 to the roaming carrier RAN 18.

In addition, the figure depicts coupled between the MSC of the roaming carrier RAN 18 and the STP network 64 a short message service center (SMSC) 66, and likewise between the MSC of the home carrier RAN and the STP network 64 an SMSC 68. Each SMSC functions to store and forward SMS messages to destination entities. For instance, when SMSC 66 receives an SMS message destined to a WCD currently being served by roaming carrier RAN 18, the SMSC may seek to deliver that SMS message to roaming carrier RAN 18 or may hold the message until the roaming carrier RAN 18 can receive it. Once the roaming carrier RAN receives the message from SMSC 66, the roaming carrier RAN 18 may then transmit the SMS message via air interface 22 to the destination WCD. Similarly, when SMSC 66 receives an SMS message transmitted from a WCD served by roaming carrier RAN 18 and destined to some other entity (whether another WCD or a different entity capable of receiving SMS messages, perhaps an e-mail client for instance), SMSC 66 routes the message to that destination entity. When the destination entity is an entity served by home carrier RAN 26, the roaming carrier SMSC 66 may transmit the message via STP network 64 to the home carrier SMSC 68 for transmission of the message in turn to the destination. Alternatively, SMSC 64 may transmit the message to a message gateway that may in turn transmit the message via a packet-data connection to its destination. Other arrangements are possible as well.

The functions depicted in FIG. 2 can be implemented as well in the arrangement of FIG. 3 by way of example.

In practice, WCD 12 may register with roaming carrier RAN 18 by sending a registration message that causes the MSC of the roaming carrier RAN 18 to send a REGNOT message via STP network 64 to HLR 32. HLR 32 would then update the WCD's registration record and send a response back to the roaming carrier RAN, and the roaming carrier RAN may send an acknowledgement to the WCD.

WCD 12 may then encounter a reporting trigger and responsively determine its location and send a report of the location in a peer-to-peer communication via the roaming carrier RAN 18 to HCRS 34. For instance, WCD 12 may send the report as an SMS message, which the roaming carrier RAN 18 would route to its destination as normal, such as to roaming carrier SMSC 66, from there via STP network 64 to the home carrier SMSC 68, and from there to the HCRS 34. Alternatively, the WCD 12 may engage in normal wireless packet-data communication to send the peer-to-peer communication via roaming carrier core packet network 60, the Internet, and home carrier core packet network 62, to an IP address of HCRS 34.

HCRS 34 may then select a nearby home carrier base station, such a nearby home carrier base station 28, based on the reported location of WCD 12 and may send a peer-to-peer response communication via roaming carrier RAN 18 to WCD 12, directing WCD 12 to transition to be served by the selected nearby home carrier base station. For instance, the HCRS may send the response communication as an SMS message via SMSC 68 and SMSC 66 to the WCD. Or the HCRS may send the response communication as an IP response communication via the packet-data networks to the WCD.

Upon receipt of the peer-to-peer communicated directive from the HCRS, the WCD 12 may then comply with the directive, by transmitting a registration message to the selected nearby home carrier base station in accordance with operational parameters specified in the directive, thus registering for service with the home carrier RAN and therefore de-registering from service with the roaming carrier RAN.

Figure 4:
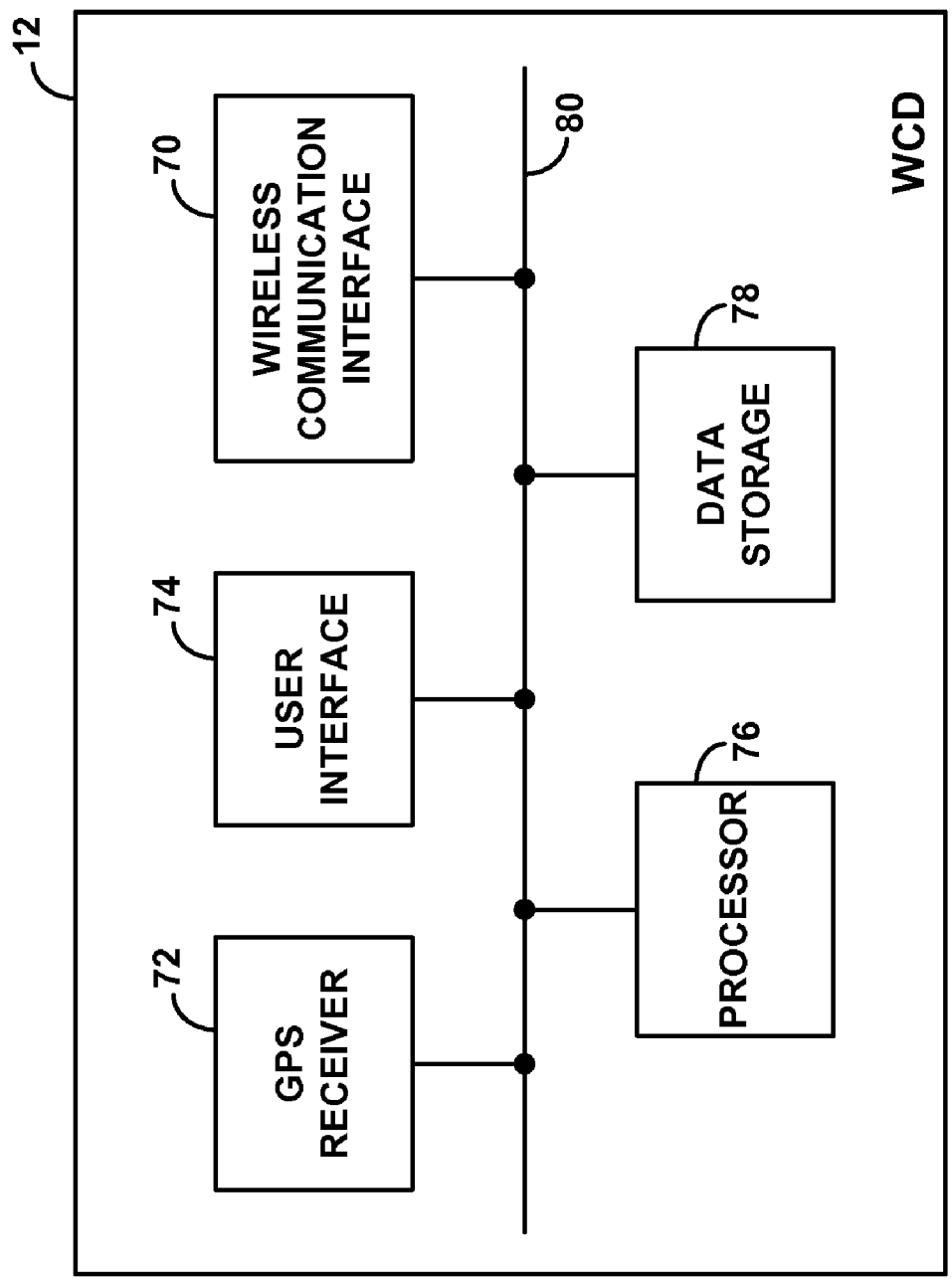
FIG. 4 is a simplified block diagram of an example wireless communication device.

FIG. 4 is next a simplified block diagram of WCD 12, depicting components that can be included in such a device. As shown, the WCD includes a wireless communication interface 70, a GPS receiver 72, a user interface 74, a processor 76, and data storage 78, all of which may be communicatively linked together by a system bus, network, or other connection mechanism 80. The WCD may take other forms as well.

Wireless communication interface 70 functions to facilitate air interface communication with a serving RAN according to one or more protocols such as those noted above. An exemplary wireless communication interface is an MSM series chipset manufactured by Qualcomm Incorporated, together with one or more internal or external antennas.

GPS receiver 72 functions communicate with GPS satellites, so as to facilitate determination of the location of WCD 12. Although GPS receiver 72 is shown separate from wireless communication interface 70, the GPS receiver function can be integrated together with the wireless communication interface function, on a single chipset for instance. By way of example, the chipset could be a Qualcomm cellular wireless chipset having "gpsOne" functionality.

User interface 74 includes components for receiving input from a user of the WCD and providing output to a user of the WCD. For instance, the user interface may include a keypad, touch-sensitive screen, microphone, and camera for receiving user input, and a display screen and speaker for providing user output. Further, the user interface may include analog/digital conversion circuitry to facilitate conversion between analog user input/output and digital signals on which the WCD can operate.

Processor 76 comprises one or more general purpose processors (such as INTEL processors or the like) and/or one or more special purpose processors (such as digital signal processors or application specific integrated circuits). To the extent processor 76 includes more than one processor, the processors could work separately or in combination. Data storage 78, in turn, comprises one or more volatile or non-volatile storage components, such as optical, magnetic, or organic storage, and data storage 78 can be integrated in whole or in part with processor 76. Preferably, data storage 78 contains program instructions executable by processor 76 to carry out various WCD functions described in this document. For instance, the program instructions may be executable by the processor 76 to engage in registration with a roaming carrier system, to report location of the WCD in a peer-to-peer communication to HCRS 34 while registered with the roaming carrier system, to receive in a peer-to-peer response communication a directive from the HCRS directing the WCD to instead communicate with a nearby home carrier base station, and to responsively register with and be served by the indicated home carrier base station in accordance with operational parameters provided by the directive.

Figure 5:
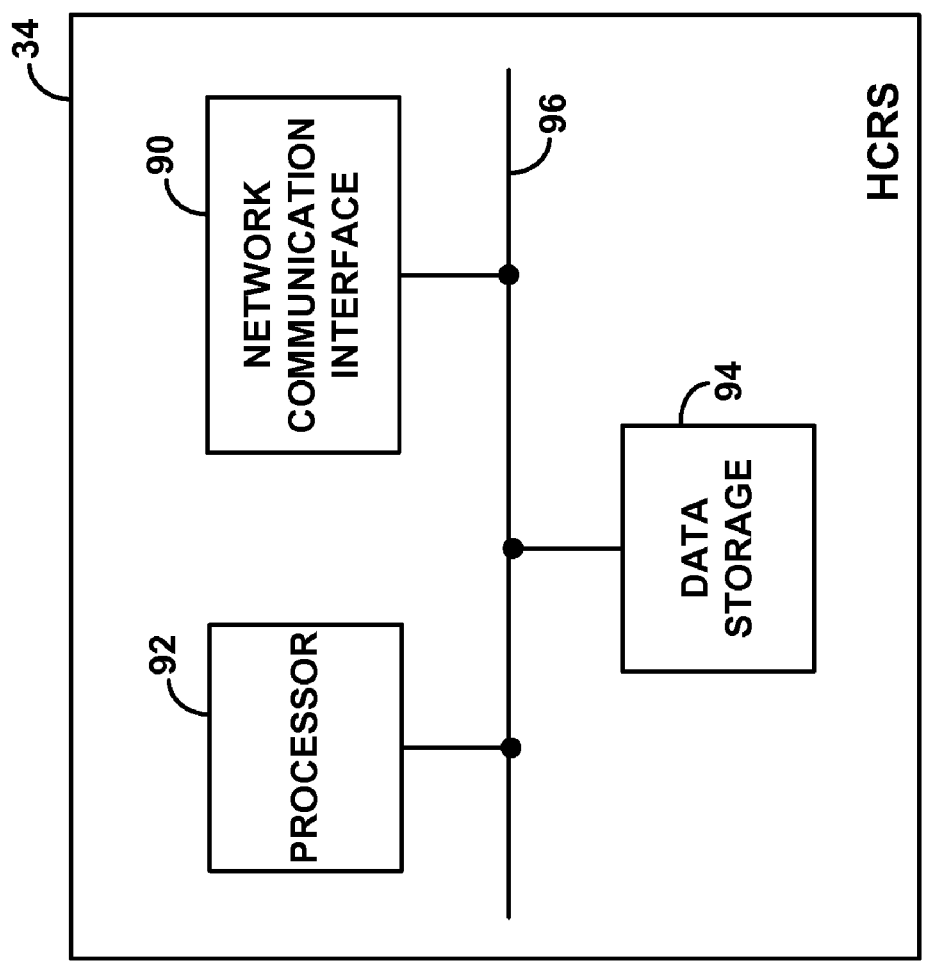
FIG. 5 is a simplified block diagram of an example home carrier redirection server.

FIG. 5 is in turn a simplified block diagram of HCRS 34, depicting components that can be included in such a server. As shown, the HCRS 34 includes network communication interface 90, a processor 92, and data storage 94, coupled together by a system bus, network, or other connection mechanism 96. The HCRS may take other forms as well.

Network communication interface 90 provides for connection with a network through which HCRS 34 can receive location reports from WCDs such as WCD 12 and can responsively transmit directives directing such WCDs to transition to be served by nearby home carrier base stations. For instance, the network communication interface may comprise an Ethernet network interface card suitable for coupling with a packet-data network and/or a mechanism suitable for coupling with other bearer connections.

Processor 92 comprises one or more general purpose processors (such as INTEL processors or the like) and/or one or more special purpose processors (such as digital signal processors or application specific integrated circuits). To the extent processor 92 includes more than one processor, the processors could work separately or in combination. Data storage 94, in turn, comprises one or more volatile or non-volatile storage components, such as optical, magnetic, or organic storage, and data storage 94 can be integrated in whole or in part with processor 92.

Preferably, data storage 94 contains program instructions executable by processor 92 to carry out various HCRS functions described in this document. For instance, the program instructions may be executable by the processor 92 to receive a peer-to-peer location-report from WCD 12, to select a nearby home carrier base station to serve the WCD, and to generate and send a peer-to-peer directive to the WCD to direct the WCD to transition to be served by the selected nearby home carrier base station. To facilitate this, the data storage may further contain mapping data that specifies locations of various home carrier base stations, operational parameters of the various home carrier base stations. Further, to enable the HCRS to provide the WCD with an initial transmit power level, the data storage may additionally contain data that correlates various distances with such initial power levels. Alternatively, rather than providing this and other data in data storage of the HCRS itself, the data could be stored elsewhere and accessed by the HCRS.

In a preferred embodiment, the HCRS functions can be implemented in a computer server that is in place for one or more other purposes as well. For instance, the computer server can be situated in the home carrier's network for purposes of collecting performance-monitoring (diagnostic) data from WCDs. Thus, client logic in the home carrier's subscriber devices may already be configured to engage in peer-to-peer communication with the computer server, for purposes of reporting collected diagnostic data to the computer server. Implementing the present method in that context, the subscriber devices can be made further to notify the HCRS of their location when roaming, and the HCRS can be made to direct the subscriber devices to transition over to service from nearby home base stations.

An exemplary embodiment of the present invention has been described above. Those skilled in the art will understand, however, that changes and modifications may be made to the embodiment described without departing from the true scope and spirit of the invention, which is defined by the claims.

What is claimed is:

1. A wireless communication device comprising:
a wireless communication interface arranged to communicate over an air interface with a serving radio access network (RAN), wherein the device operates under a service subscription with a home carrier having a home carrier RAN and is served by the home carrier RAN when in coverage of and registered for service with the home carrier RAN but is served by a roaming carrier RAN of a roaming carrier when in coverage of and registered for service with the roaming carrier RAN; and
a location-determination module arranged to determine a geographic location of the device,
wherein, when the device detects coverage of the roaming carrier RAN, the device sends a registration message to the roaming carrier RAN, which triggers the roaming carrier RAN to notify the home carrier that the device is being served by the roaming carrier RAN, the device then being successfully registered for service with the roaming carrier RAN,
wherein, when the device has successfully registered for service with the roaming carrier RAN and is being served by the roaming carrier RAN, the device encounters a reporting trigger and responsively determines the geographic location and sends a report of the determined geographic location via the roaming carrier RAN to a home carrier server operated by the home carrier so as to allow the home carrier server to select, based on the reported geographic location, a nearby home carrier base station to serve the device, and
wherein the device receives from the home carrier server via the roaming carrier RAN a directive generated by the home carrier server in response to the report, the directive directing the device to be served by the selected nearby home carrier base station, and wherein, in response to the received directive, the device responsively transitions to be served by the nearby home carrier base station.

2. The wireless communication device of claim 1, wherein the location-determination module comprises a Global Positioning System (GPS) receiver, wherein the location-determination module determines the location of the device based on received GPS signals.

3. The wireless communication device of claim 1, wherein the registration message to the roaming carrier RAN triggers the roaming carrier RAN to notify the home carrier by a mobile switching center of the roaming carrier RAN sending a corresponding registration message for receipt by a home location register of the home carrier, wherein the home location register responsively acknowledges registration of the device for service in the roaming carrier RAN.

4. The wireless communication device of claim 1, wherein the reporting trigger comprises a function selected from the group consisting of (i) completing of registration with the roaming carrier RAN, (ii) establishing of an active communication session served by the roaming carrier RAN, (iii) ending of an active communication session served by the roaming carrier RAN, and (iv) elapse of a predefined period of time.

5. The wireless communication device of claim 1, wherein the directive specifies operational parameters of the nearby home carrier base station, the operational parameters being usable by the device to tune to and begin communication with the nearby home carrier base station.

6. The wireless communication device of claim 5, wherein the operational parameters include an initial transmit power usable by the device for initial communication from the device to the nearby home carrier base station, wherein the device begins transmission to the nearby home carrier base station at the specified initial transmit power by transmitting an access probe at the specified initial transmit power for receipt by the nearby home carrier base station.

7. The wireless communication device of claim 6, wherein the initial transmit power is selected based on distance between the reported location of the device and a location of the nearby home carrier base station.

8. The wireless communication device of claim 5, wherein the operational parameters comprise a carrier frequency and sector identification with which the device should communicate with the nearby home carrier base station.

9. The wireless communication device of claim 8, wherein the sector identification comprises a pseudo-random noise (PN) offset.

10. The wireless communication device of claim 1, wherein the device sends the report in a message addressed to a predefined address of the home carrier server.

11. The wireless communication device of claim 1, wherein the device sends the report in a Short Message Service (SMS) message to the home carrier server, and the device receives the directive in an SMS return message from the home carrier server.

12. A system operated by a home wireless carrier, the system comprising:
a home location register for registering current operating location of a wireless communication device that subscribes to service with the home wireless carrier, wherein, when the device detects coverage of a roaming carrier radio access network (RAN) operated by a roaming carrier, the device successfully registers for service with the roaming carrier by a process including (i) the device sending a registration message to the roaming carrier RAN, (ii) a registration update responsively being performed in the home location register, and (iii) a reply being sent to the device; and
a computer comprising a processor,
wherein, when the device has successfully registered for service with the roaming carrier RAN and is being served by the roaming carrier RAN, the computer receives in a peer-to-peer communication from the device to the computer, via the roaming carrier RAN, a report of the location of the device, and
wherein, in response to the report, the processor (i) uses the reported location as a basis to select a home carrier base station nearby the reported location and (ii) generates and sends in a peer-to-peer response communication from the computer to the device, via the roaming carrier RAN, a directive that directs the device to be served by the selected nearby home carrier base station, so as to cause the device to transition to be served by the selected nearby home carrier base station.

13. The system of claim 12, further comprising the nearby home carrier base station,
wherein after the processor sends the directive to the device, the nearby home base station receives registration signaling from the device when the device tunes to the nearby home carrier base station in response to the directive, and wherein the nearby home carrier base station then serves the device with wireless communication service.

14. The system of claim 12, wherein the directive specifies operational parameters of the nearby home carrier base station, the operational parameters being usable by the device to tune to and begin communication with the nearby home carrier base station.

15. The system claim 14, wherein the operational parameters include an initial transmit power usable by the device for initial communication from the device to the nearby home carrier base station.

16. The system of claim 15, wherein the processor selects the initial transmit power based on distance between the reported location of the device and a location of the nearby home carrier base station.

17. The system of claim 12, wherein the peer-to-peer communication from the device to the computer is a Short Message Service (SMS) message, and the peer-to-peer response communication from the computer to the device is an SMS message.

18. A method comprising:
a home carrier providing a wireless communication device for use under a service subscription with the home carrier, the home carrier having a home carrier radio access network (RAN) including a home carrier base station, the home carrier having a home location register that holds data specifying current operating location of the device, and the home carrier having a computer that is arranged direct the device to home service when the device is roaming;
when the device has successfully registered for service with a roaming carrier RAN and is being served by the roaming carrier RAN, the computer receiving in a peer-to-peer communication from the device to the computer, via the roaming carrier RAN, a report of geographic location of the device; and
in response to the report, (i) the computer using the reported location as a basis to select a home carrier base station nearby the reported location and (ii) the computer generating and sending in a peer-to-peer response communication from the computer to the device, via the roaming carrier RAN, directive that directs the device to be served by the selected nearby home carrier base station, so as to cause the device to transition to be served by the selected nearby home carrier base station.

19. The method of claim 18, wherein the device responds to the directive by transitioning to be served by the selected nearby home base station.

20. The method of claim 18, further comprising:
determining a distance between the reported location and a location of the selected nearby home carrier base station;

using the distance as a basis to determine an initial reverse link transmit power for use by the device to communicate with the nearby home carrier base station;

the computer including in the directive a specification of the determined initial transmit power; and the nearby home base station then receiving an initial communication transmitted at the determined initial reverse link transmit power from the device as specified by the directive.

* * * * *